United States Patent
Cooper et al.

(10) Patent No.: US 10,212,231 B2
(45) Date of Patent: Feb. 19, 2019

(54) METHODS AND SYSTEMS FOR DETECTING A MATERIAL SOURCE USING A SERVER AND NETWORKED SENSORS

(71) Applicant: Passport Systems, Inc., Billerica, MA (US)

(72) Inventors: Daniel A. Cooper, Acton, MA (US); James B. Costales, Winchester, MA (US); Krzysztof E. Kamieniecki, Acton, MA (US); Robert J. Ledoux, Harvard, MA (US); Jeffrey K. Thompson, Freemont, CA (US); Stephen E. Korbly, Acton, MA (US)

(73) Assignee: Passport Systems, Inc., Billerica, MA (US)

( * ) Notice: Subject to any disclaimer, the term of this patent is extended or adjusted under 35 U.S.C. 154(b) by 0 days.

(21) Appl. No.: 15/130,285

(22) Filed: Apr. 15, 2016

(65) Prior Publication Data

US 2017/0302759 A1 Oct. 19, 2017

Related U.S. Application Data (63) Continuation of application No. PCT/US2016/012174, filed on Jan. 5, 2016.

(60) Provisional application No. 62/100,700, filed on Jan. 7, 2015.

(51) Int. Cl.
*H04L 29/08* (2006.01)
*H04W 4/35* (2018.01)

(52) U.S. Cl.
CPC .............. *H04L 67/12* (2013.01); *H04L 67/18* (2013.01); *H04L 67/36* (2013.01); *H04W 4/35* (2018.02)

(58) Field of Classification Search
None
See application file for complete search history.

(56) References Cited

U.S. PATENT DOCUMENTS

| | | | | |
|---|---|---|---|---|
| 7,542,884 B2* | 6/2009 | Boris | ...................... | G08B 21/12 345/30 |
| 7,720,026 B2* | 5/2010 | Chen | ...................... | G08G 1/161 370/328 |
| 7,822,564 B2* | 10/2010 | Davis | ...................... | H04W 4/02 702/60 |
| 8,502,158 B1* | 8/2013 | Gordeev | ................... | G01T 7/00 250/394 |

(Continued)

FOREIGN PATENT DOCUMENTS

CN 103546966 A 1/2014
KR 100772989 B1 11/2007

(Continued)

OTHER PUBLICATIONS

International Search Report and Written Opinion for PCT/US2016/012174, dated Apr. 21, 2016.

(Continued)

*Primary Examiner* — Shirley X Zhang
(74) *Attorney, Agent, or Firm* — Foley Hoag LLP; Rajesh Vallabh (57) ABSTRACT

A large system of networked sensors requires the management and distribution of sensor data via an intelligent server (SmartServer). In this network of sensors, one or more SmartServers use the underlying processes of source detection to optimize network data flow.

20 Claims, 4 Drawing Sheets

(56) References Cited

U.S. PATENT DOCUMENTS

| | | |
|---|---|---|
| 9,429,661 B2 * | 8/2016 | Valentino .............. G01J 1/0488 |
| 2006/0280129 A1 | 12/2006 | Kline et al. |
| 2007/0260716 A1 * | 11/2007 | Gnanasambandam ...................... G06Q 10/06 709/223 |
| 2009/0204348 A1 * | 8/2009 | Davis ...................... H04W 4/02 702/60 |
| 2010/0315242 A1 | 12/2010 | Bullard et al. |
| 2011/0251800 A1 * | 10/2011 | Wilkins ................... G01J 3/02 702/24 |
| 2013/0325357 A1 | 12/2013 | Walerow et al. |
| 2014/0099882 A1 | 4/2014 | Woosnam |

FOREIGN PATENT DOCUMENTS

| | | |
|---|---|---|
| WO | 2004/051868 A2 | 6/2004 |
| WO | 2014/133687 A2 | 9/2014 |

OTHER PUBLICATIONS

Extended European Search Report received for EP patent application No. EP 16735295, dated Aug. 22, 2018.
Koutsoukos et al., "OASiS: A Service-Oriented Architecture for Ambient-Aware Sensor Networks," Lecture in Computer Science, Springer International Publishing, 4888: 125-149 (2006).

* cited by examiner

METHODS AND SYSTEMS FOR DETECTING A MATERIAL SOURCE USING A SERVER AND NETWORKED SENSORS

CROSS-REFERENCE TO RELATED APPLICATIONS

This application is a continuation of International Patent Application Number PCT/US16/12174, which claims benefit of and priority to U.S. Provisional Ser. No. 62/100,700, entitled "INTELLIGENT SERVER IN A SYSTEM OF NETWORKED SENSORS," filed Jan. 7, 2015, both of which are hereby incorporated herein by reference in their entirety.

BACKGROUND

There is a growing concern that a radiological dispersal device ("dirty bomb") could be used by terrorist particularly in places with a high density of people or in areas of high value commercial or government properties and facilities. Since such a device would be small enough to be man or vehicle portable, the best probability to detect and interdict such a device is to widely distribute a network of spectroscopic radiation sensors that are mobile, man portable, work without operator intervention and are connected to central command and control sensor and optionally to one another. This provides the most general and dynamic scheme to monitor and map a large, uncontrolled area potentially full of people. An additional important benefit of such a system is that it can detect radioactive sources that, although not intended as terrorist threats, still pose public safety problems. For example, there have been incidents where untended industrial and medical sources have been released without proper safeguards into public areas.

Any local measurement of radiation has contributions from Naturally Occurring Radioactive Materials (NORM) in that locale and possible non-NORM sources ranging from medical isotopes (from patients for example which just underwent a stress test), industrial isotopes not properly secured or being used for nefarious purposes and Special Nuclear Materials (SNM) that can be used in a nuclear device (or a nuclear device already assembled). Detection algorithms must estimate the contributions of both NORM backgrounds and the presence of possible non-NORM radioactive sources.

The detection of natural and manmade sources using distributed radiation sensors over large geographic areas poses unique and complex networking and computational problems. It has been demonstrated that fusing spectral data from sensors that are in proximity offers higher sensitivity and low false alarm rates, for example, as described in PCT/US2014/012330, published as WO 2014/0133687, and U.S. patent application Ser. No. 14/237,088, all of which are hereby incorporated herein by reference in their entirety. The spatial scale over which spectral data fusion is useful is determined by intrinsic sensor properties such as the absolute efficiency, and energy resolution of the sensor. External properties of importance are the energy, and strength of the radioactive source and any shielding materials that are between the source and sensor. For example, spatial scales of order few times 10 m are obtained for handheld spectroscopic radiation sensors. Thus in a large system of tens of thousands of sensors in a city there may be a large number of clusters of sensors in which real time sharing (of order seconds) of spectral data through a server or system of servers is helpful to reap the full benefits of spectral data fusion. Efficient and responsive network systems can generate a dynamic set of clusters that allow full data sharing for optimal detection performance. For sensor nodes that are isolated (i.e., nodes that do not benefit from real time data sharing), data transmission will consist of node position, health, background spectra measurements and any detection alarms. The network SmartServer can dynamically determine if open bandwidth is present so that even isolated nodes can dynamically transmit spectral data for background mapping. Optionally, if the Server determines that open bandwidth is not present the node can locally log data and upload to the system when bandwidth is available and/or there is a local "base" connection to the server. It is also desirable for two way communication between command and control provided through the SmartServer. Usually the required bandwidth for such communication consists of passing alarms, texts, etc. and is typically small as compared to that required for data fusion.

As discussed above, a high spatial resolution statistically significant map of the NORM background is crucial for high sensitivity searches for non-NORM radiation sources. NORM background can vary significantly over small spatial scales particularly in urban environmental with a large variety of construction materials are present. Therefore, fine scale measurements of the background are highly desirable to ensure high sensitivity to the presence of non-NORM sources of radiation while retaining a low rate of false alarms. A distributed network of radiation sensors with spectroscopic capabilities is an effective method for obtaining large area coverage of NORM background. Particularly if the sensors are mobile, they can differentiate isotopes of interest and can do this without operator intervention or supervision. Therefore, optimal network architecture must be able to collect, store and distribute this constantly updated background map. In a large system, a SmartServer can improve performance by allocating the available resources between the search for non-NORM sources of radiation and the collection and distribution of background data.

SUMMARY

A large system of networked sensors requires the management and distribution of sensor data via an intelligent server (SmartServer). In this network of sensors, one or more SmartServers use the underlying processes of source detection to optimize network data flow.

DETAILED DESCRIPTION

The presence of a source can be detected using a network of sensors. The network of sensors includes mobile and fixed sensors. In order to patrol an area, mobile sensors are carried by a group of people walking or mounted on vehicles. Mobile sensors are connected to a network through a wired or wireless connection. The people that would patrol an area using mobile sensors include, but not limited to, security personnel and first responders. Fixed sensors are situated in a permanent location, where constant monitoring is preferred or required. Locations that would use a fixed sensor include, but are not limited to, security checkpoints, major intersections, exits or entrances of buildings, or other significant, high importance locations. Fixed sensors are connected to a network through a wired or wireless connection. The detector may be a radiation detector, a chemical detector, or any other suitable detector for the source in question. In normal operation each networked sensor collects data that may be transmitted to a central node (for processing and archiving) or other mobile sensor nodes in the network, and the sensor nodes may in turn receive such signals, either from other sensor nodes or from a central node, with the result that data from the network as a whole is collectively processed to determine if, when, and where a source is present.

As explained in WO 2014/0133687, sources can be detected in real time by analysis of data collected by a network of sensors. Computation and detection can be carried out in a single central computer, or on a plurality of distributed computers, for example, in processors located at each sensor node in the network. Computational detection can be carried out on a data set obtained from any collection of sensors, for example, all sensors in the network, or one or more subsets of all sensors in the network. Carrying out the computational detection algorithms using data obtained from only a subset of the sensors can have several advantages, as explained below, depending on how the subset is defined.

Figure 1:
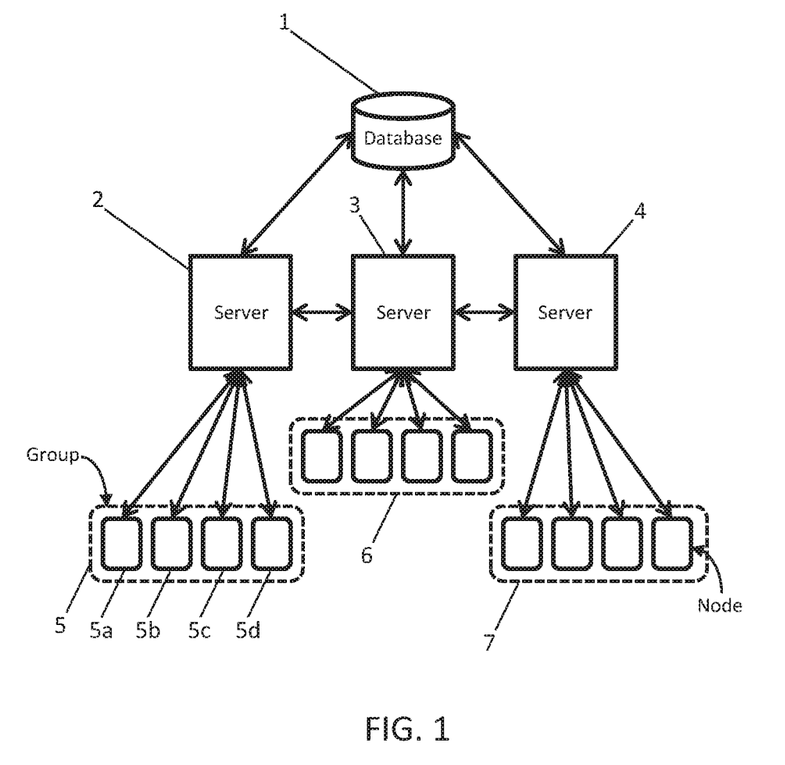
FIG. 1 schematically shows one possible arrangement of elements in a system with dynamic node grouping.

FIG. 1 schematically shows one possible arrangement of elements in a system with dynamic node grouping. Data is stored in a database 1. Servers 2, 3, 4, communicate with the database 1. Each server is associated with a group 5, 6, 7 of nodes, e.g., 5a-5d, etc., in the network. The nodes are dynamically grouped according to the conditions of the system. As shown, each server has an equal number of nodes, but this need not be true generally; because the node grouping is dynamically responsive to system conditions, the number of nodes in each grouping will vary from group to group and over time. In this case, the nodes 5a-5d each carries a sensor for detecting a material of interest, e.g., a radiation or chemical sensor, and may also include elements capable of determining the sensor's position, velocity, orientation and acceleration. Each sensor node 5a-5d in the group 5 communicates with its designated server 2. The server 2 can carry out multiple functions. The server 2 can operate on the data reported from the nodes 5a-5d to determine whether a source has been detected, for example, by using the methods described in WO 2014/0133687, which is hereby incorporated herein by reference in its entirety. Alternatively, the detection process can be carried out on other computers, such as central processing node, or alternatively on computers on board each sensor node, while the servers 2, 3, 4 focus on the optimal assignment of nodes to groups. The server 2 can communicate with the other servers 3, 4 to determine whether any of the sensor nodes 5a-5d should be moved to another node group 6, 7. For example, the server 2 can compare the locations of the various nodes to determine whether one node has moved from a geographic area associated with a first group into a geographic area associated with a second group. A server can communicate with other servers to determine whether a source has been detected in a node group, in which case the server might move nodes into or out of the group in which a detection has been made. A server might measure the amount of network traffic amongst the nodes in its group and, by comparing to the traffic in other groups, determine that system performance could be improved or optimized if a node were to be moved from one group to another.

As shown in FIG. 1, all the servers can be physically distinct, networked computers with their own dedicated processors. Alternatively, a system capable of all the same functionality could be set up with a single server assigning nodes into subgroups. In that case, a single server would collect the necessary data from all nodes on the network, analyze the relevant network and system parameters such as network traffic, geography, and presence or absence of detections, and determine whether the current grouping or an alternative grouping is preferred.

Node groupings can be optimized to various effects. For example, in a system where each node communicates with every other node in the group, the quantity of network traffic in a single group will be of order of the square of the number of nodes in the group. By dividing the nodes into N groups, the total traffic on the system will be reduced by roughly a factor of N compared to the case where all nodes are in a single system-wide group. Node groupings can also be based simply on geography. Each sensor node will have a certain sensitivity, and correspondingly a certain geographic range over which it is likely to be sensitive to the presence of a source. Sensor nodes may be grouped to make sure that the ranges of the nodes in a given group overlap sufficiently to provide full coverage of a certain geographic area. This may change over time, as sensor nodes may be moved, as with nodes that are attached to patrol personnel.

It may also be advantageous to group nodes geographically once a source has been detected. For example, if a moving source has been detected, the system could dynamically group nodes so as to follow the motion of the source, always having a higher concentration of nodes near where the source is expected to be based on its last estimated velocity. Similarly, in the case of a tentative detection, the system may allocate more nodes to a group near the tentative detection to follow-up.

The system may also expand the geographical size of a group in response to a detection or tentative detection. For example, if each group is initially designated to cover an predetermined area, say 10,000 square meters, and a detection or tentative detection is made in one such grouping, it may be helpful to merge adjacent groups into the group where a detection was made in order to pursue that source and increase confidence that the source will not move undetected out of its current group.

Similarly, the system may take into account a priori knowledge of the geography to group nodes intelligently. For example, the system may group nodes, not simply by geographic proximity to each other, but rather by proximity to existing landmarks, such as streets. Rather than a grouping defined by a single radius, the system could group nodes along a single street, or around an intersection. See discussion of FIGS. 2-4 below.

Grouping sensor nodes is also an indirect way of intelligently allocating computing power. In any detection algorithm, such as the particle filtering algorithm described in WO 2014/0133687, analysis of more data requires more computing power. But more data does not necessarily increase useful sensitivity of the detection algorithm. For example, if two groups of sensors are geographically segregated to the point where their ranges do not significantly overlap, it may be more computationally efficient to treat the two groups totally separately. Data from the first group will not typically help the system detect a source in the geographic area of the second group, and vice versa. So there is no benefit to including all the data in a single detection calculation, only computational cost. Particle filtering algorithms are particularly well-suited to use with this sort of dynamic grouping. Each particle represents a possible state in phase space including information like source location, velocity and strength, and potentially sensor properties as well. Since every group in which a particle filtering algorithm is being run will use the same type of particles, those particles can easily be passed from one group to another. This can be useful, for example, in tracing the movement of a source from one geographic area to another.

Typically the initial assignment of sensor nodes to groups will be based on a priori knowledge of the geographic area in which the system is operating. Groups may be centered on a fixed position of interest, for example a secured entrance/exit from a building. The fixed position may be focused on one or more stationary sensor nodes. A group may be limited to sensors carried by personnel that are all part of a single unit, for example a particular group or squad of first responders, or a security team.

Another advantage of the present systems and methods is scalability. Unlike a networked system of nodes with full bi-directional communication between all nodes, in which the volume of communication traffic (as well as corresponding computational problems) is of order $N^2$, dividing the nodes up into groups allows an operator of the system to increase system traffic and computation roughly proportional to the number of nodes. An operator that wants to add another group of nodes to cover an additional geographic area need only add the additional number of nodes and a proportional increase in number or power of underlying servers. There is no need to scale the resources as $N^2$.

Figure 2:
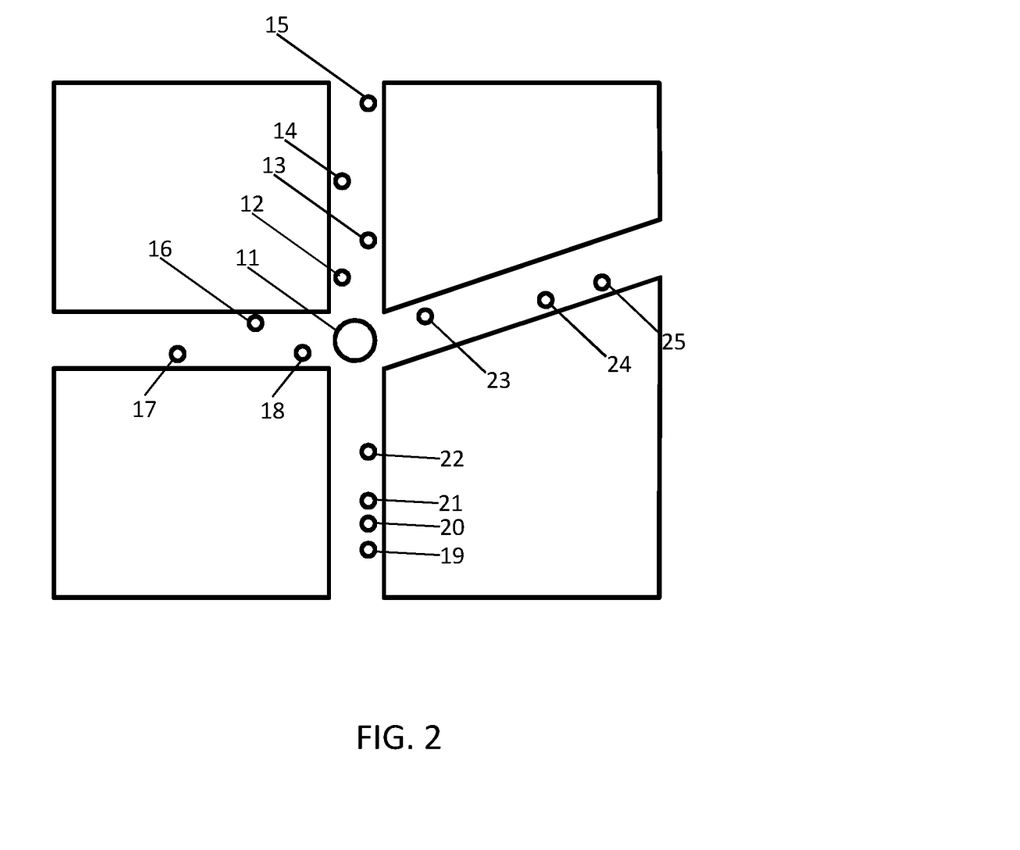
FIG. 2 shows schematically a series of sensor nodes spread out around an intersection of streets.
Figure 3:
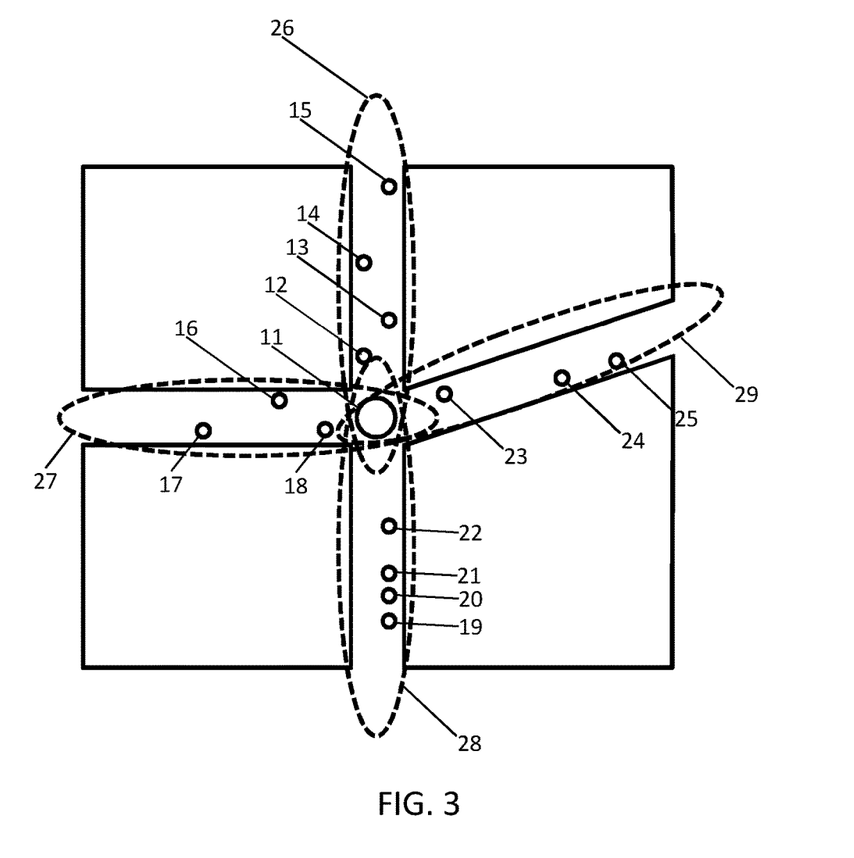
FIG. 3 shows the same set of sensor nodes as FIG. 2, now divided into four groups, shown schematically with dashed lines.

FIG. 2 shows schematically a series of sensor nodes 11-25 spread out around an intersection of streets. A stationary node 11 is centered on the intersection, for example, a sensor installed on a traffic light. The other nodes 12-25 are schematically shown as smaller circles to indicate that they are mobile nodes, perhaps attached to a person or to a vehicle. FIG. 3 shows the same set of nodes divided into four groups, 26-29, shown schematically with dashed lines. Each group covers a single street leading upto the intersection, but all groups include the stationary node 11 at the intersection. In this particular case, the groupings are defined by geography, but not simply by the range of the detectors. Such a priori knowledge of geography can be input into the system in the form of a map or series of maps and combined with location information from the various sensor nodes, for example, GPS data.

Figure 4:
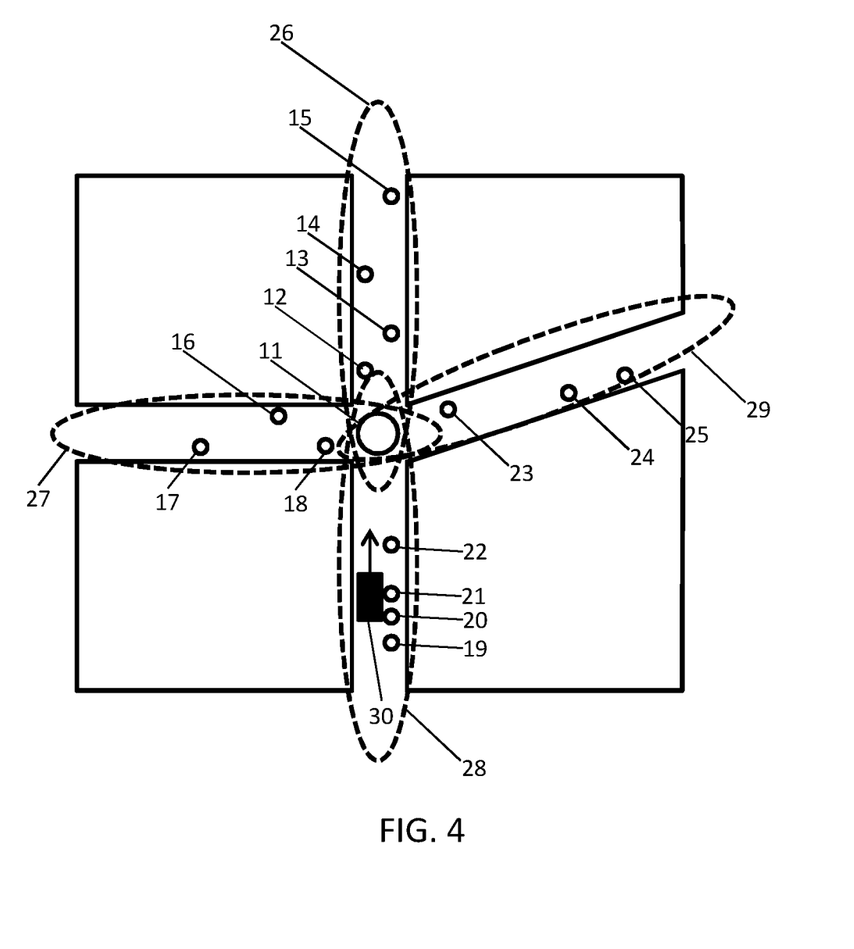
FIG. 4 shows the same set of sensor nodes as FIGS. 2 and 3 in their groups, but now adds a source moving along one of the streets toward the intersection.

FIG. 4 shows the same sensor nodes in their groups, but now adds a source 30 that is detected, either confidently or tentatively, in group 28, the source moving along one of the streets toward the intersection. In such a case, the system could make an algorithmic determination to expand group 28 to include, for example, nodes 18, 23, and 12, thereby allowing group 28 to continue accurately tracking the source 30 into and perhaps through the intersection. Or the system could combine all four groups 26-29 into a single group temporarily in order to determine which street the source 30 follows out of the intersection. Once the source 30 has left the intersection, where the node groups have a natural geographic overlap, the system could divide the nodes back out into their original groupings as the system continues to detect the source 30 moving along one of the streets.

In a situation such as the one described in FIG. 4, the system can also send feedback and instructions to the individual sensor nodes. For example, if the source is stopped in a particular location near the intersection, the system can instruct those carrying particular nodes to gather around the source to improve detection confidence, or to spread out in order to better capture future movements of the source.

In all the cases discussed herein, nodes can be grouped according to algorithms, based on a priori knowledge of the environment, based on specific instructions from human operators perhaps intervening in algorithmic decision-making, and any combinations thereof.

Methods of detecting a source can employ a plurality of nodes, each node including a sensor capable of collecting data and a transmitter configured to transmit at least sensor data collected by the sensor and location data representing at least the location of the node, a network capable of allowing transmission of data between and among the plurality of nodes and between the plurality of nodes and at least one computer, and a first computer having an input configured to receive data transmitted by nodes through the network, a memory configured to collect data transmitted by the nodes through the network, a processor configured to combine sensor and location data and compare the combined data to a predetermined detection criterion to determine whether a source is detected, and an output. Such methods can include collecting, in the first computer, location data transmitted through the network from each node to the first computer, the data being associated with a predetermined time, for each node, associating the node at the predetermined time with at least one of a plurality of node groups based at least in part on at least one of (a) a position of the node, (b) a velocity of the node, and (c) a measure of traffic on the network, for each node group, determining whether a source has been detected by the node group by combining, in the first computer, sensor data and location data collected from the nodes in the group and comparing, in the first computer, the combined sensor data and location data to at least one predetermined detection criterion, and signaling, with the output, at least whether a source has been detected.

Such methods can be iteratively repeated at each of a plurality of predetermined times. The sensors can be, for example, radiation or chemical sensors. Each node can be associated at the predetermined time with at least one of a plurality of node groups based, for example, solely on a position of the node, solely on a velocity of the node, or solely on a measure of traffic on the network, based on any combination of position, velocity, and/or network traffic. Associating each node at the predetermined time with at least one of a plurality of node groups can be carried out by the first computer, or by a second computer that is not the first computer, or by a plurality of computers none of which is the first computer.

The invention claimed is:

1. A computer-implemented method of detecting a source using a plurality of sensor devices and a computer server system remote from the sensor devices, the plurality of sensor devices communicating with the computer server system over a communications network, the method comprising the steps, each performed by the computer server system, of:
   (a) assigning, by the computer server system, each of the plurality of sensor devices to at least one of a plurality of sensor device groups;
   (b) receiving data at the computer server system over the communications network from each of the sensor devices, said data including at least sensor data collected by each sensor device and location data representing at least a location of each sensor device;

(c) for each sensor device group, determining, by the computer server system, whether a source has been detected by the sensor device group by analyzing the sensor data and the location data collected by the computer server system from the sensor devices in the sensor device group in connection with at least one predetermined detection criterion;

(d) dynamically optimizing grouping of the sensor devices, by the computer server system, to improve source detection or reduce computation costs at the computer server system by (i) moving at least one sensor device from a sensor device group to another sensor device group in which a source has been detected, (ii) moving sensor devices among sensor device groups to follow the motion of a moving detected source, (iii) moving a sensor device from one sensor device group to another sensor device group based on a velocity and position of the sensor device, (iv) moving sensor devices among sensor device groups based on a measure of network traffic in the sensor device groups, (v) moving sensor devices among sensor device groups to increase or decrease availability of sensor devices in a given geographic area, or (iv) moving sensor devices among sensor device groups based on priori information relating to a local environment; and (e) repeating steps (b), (c), and (d) a plurality of times and signaling, with an output, when a source has been detected.

2. The method of claim 1, wherein the sensor devices are radiation sensors or chemical sensors.

3. The method of claim 1, wherein step (d) comprises dynamically optimizing grouping of the sensor devices to improve source detection or reduce computation costs at the computer server system by moving at least one sensor device from a sensor device group to another sensor device group in which a source has been detected.

4. The method of claim 1, wherein step (d) comprises dynamically optimizing grouping of the sensor devices to improve source detection or reduce computation costs at the computer server system by moving sensor devices among sensor device groups to follow the motion of a moving detected source.

5. The method of claim 1, wherein step (d) comprises dynamically optimizing grouping of the sensor devices to improve source detection or reduce computation costs at the computer server system by moving a sensor device from one sensor device group to another sensor device group based on a velocity of the sensor device and a position of the sensor device.

6. The method of claim 1, wherein step (d) comprises dynamically optimizing grouping of the sensor devices to improve source detection or reduce computation costs at the computer server system by moving sensor devices among sensor device groups to increase or decrease availability of sensor devices in a given geographic area.

7. The method of claim 1, wherein step (d) comprises dynamically optimizing grouping of the sensor devices to improve source detection or reduce computation costs at the computer server system by moving sensor devices among sensor device groups based on priori information relating to a local environment.

8. The method of claim 1, wherein step (d) comprises dynamically optimizing grouping of the sensor devices to improve source detection or reduce computation costs at the computer server system by moving a sensor device from one sensor device group to another sensor device group based on a position of the sensor device and the measure of traffic on the network.

9. The method of claim 1, wherein at least some of said sensor devices are stationary and at least some of said sensor devices are mobile.

10. A computer-implemented method of detecting a source using a plurality of sensor devices and a computer server system remote from the sensor devices, the plurality of sensor devices communicating with the computer server system over a communications network, the method comprising the steps, each performed by the computer server system, of:

(a) assigning, by the computer server system, each of the plurality of sensor devices to at least one of a plurality of sensor device groups;

(b) receiving data at the computer server system from the sensor devices including at least sensor data collected by each sensor device and location data representing at least a location of each sensor device;

(c) dynamically optimizing grouping of the sensor devices, by the computer server system, to improve source detection or reduce computation costs by (i) moving at least one sensor device from a sensor device group to another sensor device group in which a source has been detected, (ii) moving sensor devices among sensor device groups to follow the motion of a moving detected source, (iii) moving a sensor device from one sensor device group to another sensor device group based on a velocity of the sensor device, (iv) moving sensor devices among sensor device groups based on a measure of network traffic in the sensor device groups, (v) moving sensor devices among sensor device groups to increase or decrease availability of sensor devices in a given geographic area, or (iv) moving sensor devices among sensor device groups based on priori information relating to a local environment;

(d) when a sensor device group detects a source, receiving source detection information at the computer server system from the sensor device group; and (e) repeating steps (b), (c), and (d) a plurality of times and signaling, with an output, when a source has been detected.

11. The method of claim 10, wherein the sensor devices are radiation sensors or chemical sensors.

12. The method of claim 10, wherein (c) comprises dynamically optimizing grouping of the sensor devices to improve source detection or reduce computation costs at the computer server system by moving at least one sensor device from a sensor device group to another sensor device group in which a source has been detected.

13. The method of claim 10, wherein (c) comprises dynamically optimizing grouping of the sensor devices to improve source detection or reduce computation costs at the computer server system by moving sensor devices among sensor device groups to follow the motion of a moving detected source.

14. The method of claim 10, wherein (c) comprises dynamically optimizing grouping of the sensor devices to improve source detection or reduce computation costs at the computer server system by moving a sensor device from one sensor device group to another sensor device group based on a velocity of the sensor device and a position of the sensor device.

15. The method of claim 10, wherein (c) comprises dynamically optimizing grouping of the sensor devices to improve source detection or reduce computation costs at the computer server system by moving a sensor device from one sensor device group to another sensor device group based on a velocity of the sensor device and the measure of traffic on the network.

16. The method of claim 10, wherein (c) comprises dynamically optimizing grouping of the sensor devices to improve source detection or reduce computation costs at the computer server system by moving a sensor device from one sensor device group to another sensor device group based on a velocity of the sensor device, a position of the sensor device, and the measure of traffic on the network.

17. The method of claim 10, wherein (c) comprises dynamically optimizing grouping of the sensor devices to improve source detection or reduce computation costs at the computer server system by moving a sensor device from one sensor device group to another sensor device group based on a position of the sensor device and the measure of traffic on the network.

18. The method of claim 10, wherein at least some of said sensor devices are stationary and at least some of said sensor devices are mobile.

19. A system for detecting a source, comprising a plurality of sensor devices and a computer server system remote from the sensor devices, the plurality of sensor devices communicating with the computer server system over a communications network, wherein the computer server system is programmed to:
   (a) assign, by the computer server system, each of the plurality of sensor devices to at least one of a plurality of sensor device groups;
   (b) receive data at the computer server system over the communications network from each of the sensor devices, said data including at least sensor data collected by each sensor device and location data representing at least a location of each sensor device;
   (c) for each sensor device group, determine, by the computer server system, whether a source has been detected by the sensor device group by analyzing the sensor data and the location data collected by the computer server system from the sensor devices in the sensor device group in connection with at least one predetermined detection criterion;
   (d) dynamically optimize grouping of the sensor devices, by the computer server system, to improve source detection or reduce computation costs at the computer server system by (i) moving at least one sensor device from a sensor device group to another sensor device group in which a source has been detected, (ii) moving sensor devices among sensor device groups to follow the motion of a moving detected source, (iii) moving a sensor device from one sensor device group to another sensor device group based on a velocity and position of the sensor device, (iv) moving sensor devices among sensor device groups based on a measure of network traffic in the sensor device groups, (v) moving sensor devices among sensor device groups to increase or decrease availability of sensor devices in a given geographic area, or (iv) moving sensor devices among sensor device groups based on priori information relating to a local environment; and
   (e) repeat steps (b), (c), and (d) a plurality of times and signaling, with an output, when a source has been detected.

20. The system of claim 19, wherein the sensor devices are radiation sensors or chemical sensors.

\* \* \* \* \*